Jan. 1, 1924.         1,479,749
A. V. SKUR ET AL
SLED
Filed Aug. 7, 1923        2 Sheets-Sheet 1
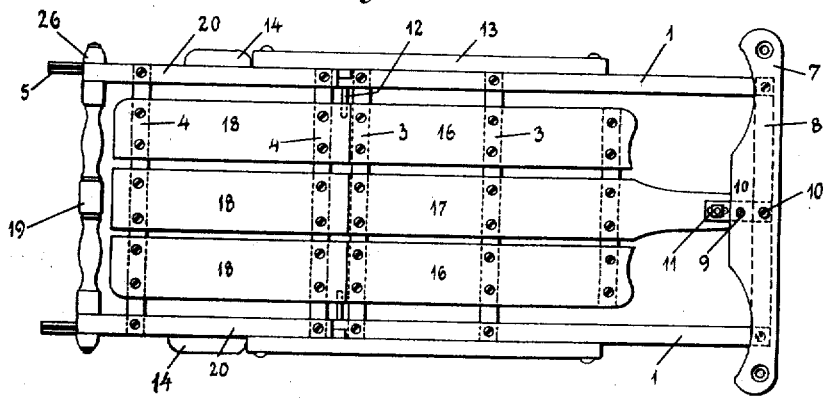
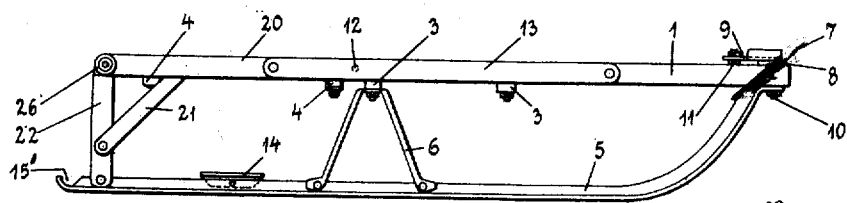
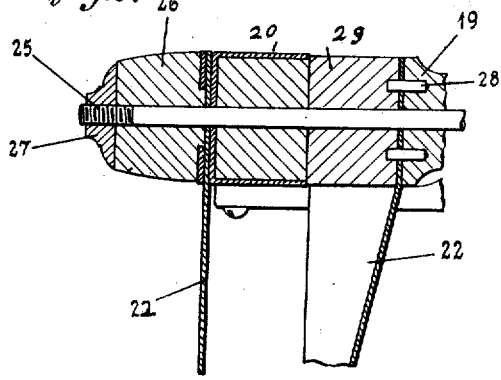
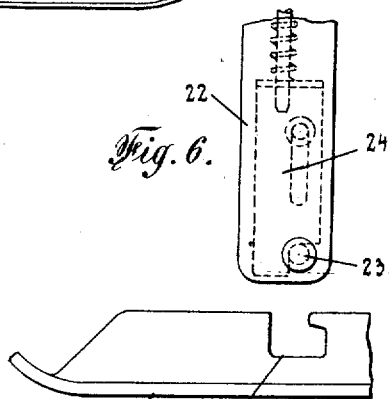
A. V. Skur and
C. J. Englund INVENTORS
BY J. O. Fowler
ATTORNEY

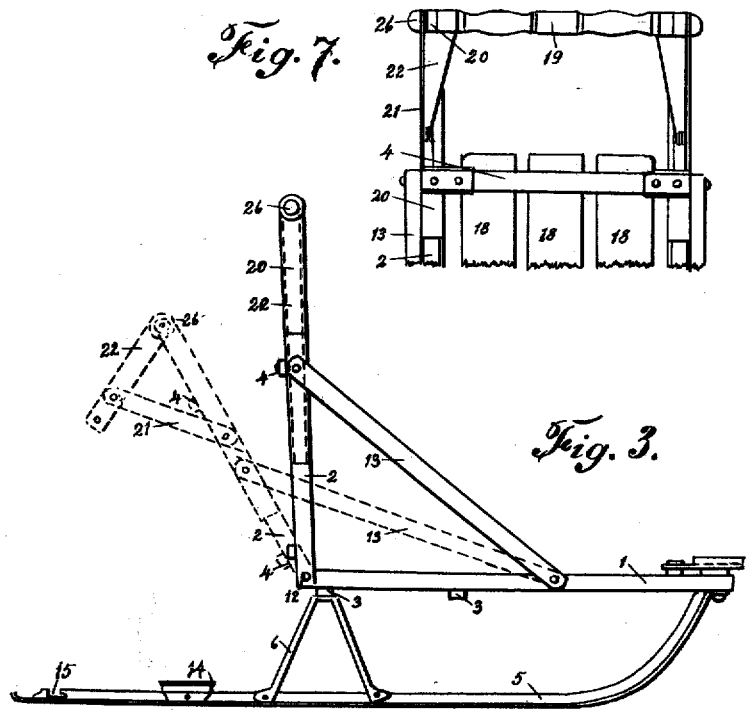
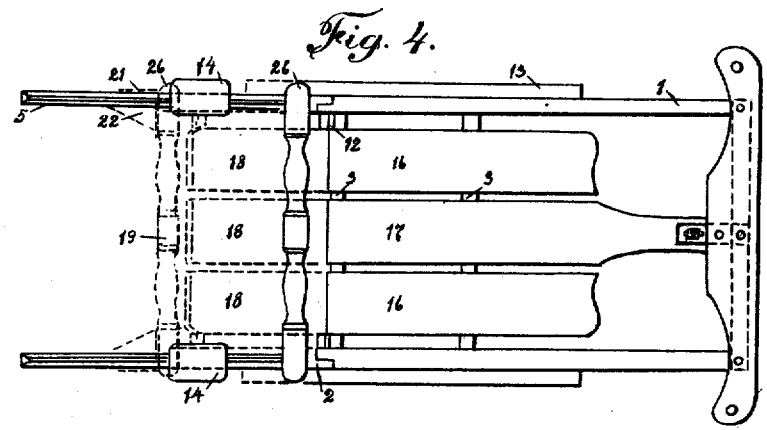

Patented Jan. 1, 1924.

1,479,749

UNITED STATES PATENT OFFICE.

AUGUST V. SKUR AND CARL J. ENGLUND, OF NEW YORK, N. Y.

SLED.

Application filed August 7, 1923. Serial No. 656,253.

*To all whom it may concern:*

Be it known that we, AUGUST V. SKUR, a citizen of Finland, and CARL J. ENGLUND, a citizen of the United States, and residents of New York, in the county of New York and State of New York, have invented a certain new and useful Sled, of which the following is a specification, the same being a full, clear, and exact description of the invention, such as will enable others skilled in the art to which it appertains to make and use the same.

This invention relates to vehicles provided with runners for conveyance over frozen snow or ice, and particularly to an article which may be used as a bob sled for coasting purposes or as a baby sled for pleasure riding and which is convertible so as to be readily utilized to perform either of said functions at will, and it has for its object the provision of an article adapted for the above use as well as for other objects and purposes which will be hereinafter described.

In order to attain the desired end our invention consists in the construction arrangement, combination and operation of parts set forth below whereby an article of the class described is produced which is simple in construction, inexpensive to manufacture and which is reliable and efficient in practical use.

In the drawings, illustrative of one embodiment of the invention, which accompany and form a part of this specification, Figure 1 represents a plan view of our device adapted for use as a bob sled;

Figure 2 is a side elevation of the same;

Figure 3 is a side elevation of the device adapted for use as a baby sled;

Fig. 4 is a plan view of the latter;

Figure 5 is a detail sectional view of the handle;

Figure 6 is a view in detail of the runner lock; and

Figure 7 is a partial rear view of the sled.

Referring more in detail to the drawings the reference numerals 1 and 2 denote the frame of the body of the sled comprising a front top face or seat 16, 17 and a rear back rest 18, the two said parts being hinged together. When used as a bob sled the back rest is locked in its lower position and is preferably secured to the runners being thus held in alignment with and in the same plane as the front seat portion. When used as a baby sled the back rest occupies its upper position and is held therein by being locked to the framework of the sled preferably by being fastened to the slide 20 and frame 2 as will be hereinafter more fully described.

Our sled has therefore two separate functions and is practically two distinct articles in one as for one use it has the general appearance of a bob sled without any suggestion of a baby sled, and for its other employment it has the general appearance of a neat baby sled without any suggestion of a bob sled.

The front frame pieces are connected by cleats 3 which serve to support the seat comprising a centre strip 17 and two side strips 16, while the back rest comprising the strips 18 is fixed to cleats 4 by which the rear frame pieces 2 are held in position. The frame pieces 1 and 2 are hinged together by the pin 12. The frame pieces 2 are inclosed within and work in slides 20 the function of which will be set forth below. The runners 5 are secured at 10 to a plate 8 connecting the parts 1 and are also held in position by braces 6 hinged to a cleat 3, and at the rear are caught by the lock pieces 22 extending from the handle 19 and attached to the slides 20, the said runners being preferably provided with a foot piece 14.

A rod 25 runs through the handle 19 and the end pieces 29 and the buttons 26 the parts being held together by nuts 27 and the parts 29 and 19 being maintained in position and anchored by pins 28.

Each slide 20 is looped around the part 2 and works up and down on its frame piece 2 while the upper part of the locking extension pieces 22 is inserted in the handle and the lower part of said extensions 22 carries a catch 24 adapted when in its lower position to hold the pin 23 of the same in the bayonet joint 15 of the runners 5, the braces 21 serving to hold the parts 20 and 21 in rigid relation. At the ends of the runners they are made thinner and curved upwardly as at 15'.

When the back rest is adjusted so as to occupy its raised position it may be maintained and locked in place by extensions 22 being folded down to rest on top of the frame pieces 2. The steering bar 7 is attached by its plate 8 to a link 9 at the pivot 10, the other extremity of the link being pivoted at 11 to the centre strip 17 of the seat.

We wish it to be understood that we do not desire to be limited to the particular use or the exact details of construction shown and described, for obvious modifications will occur to persons skilled in the art.

What we claim as our invention is:—

1. A sled having a body portion comprising a sectional seat and aligned back rest, the latter being adapted to be raised and lowered, means to lock the same in its lower position, a hinge whereby the back rest may be raised, means to lock the latter in its upper position, and a steering bar attached by a link to the centre section of the seat.

2. A sled having a frame, runners, legs and a body portion comprising an aligned seat and a movable back rest, means to conceal the legs inside the back rest when the latter is in its highest position, thereby presenting unobstructed front and rear faces thereof, means to attach the seat to the front top part of the frame, and means to secure the back rest to the rear of the runners to constitute a complete bob sled, in combination with means to raise the back rest to a vertical position, and means to lock the same in said adjusted position to constitute a complete baby sled.

3. A sled having a body portion comprising an aligned seat and a back rest adapted to be raised and lowered, means to lock the latter in its lower position, a hinge whereby the back rest may be raised and means to lock the latter in its upper position the back rest comprising two side frame pieces, a handle and slides attached to the handle and working on the said side frame pieces.

4. A sled having a body portion comprising an aligned seat and a back rest adapted to be raised and lowered, a hinge whereby the back rest may be raised, the back rest comprising two side frame pieces, a handle and slides attached to the handle and working on the said side frame pieces.

5. A sled having a body portion comprising an aligned seat and a back rest adapted to be raised and lowered, a hinge whereby the back rest may be raised, the back rest comprising two side frame pieces, a handle and slides attached to the handle and working on the said side frame pieces, runners for the sled, the said handle also having extensions adapted to interlock with the runners.

6. A sled having a body portion comprising an aligned seat and a back rest adapted to be raised and lowered, a hinge whereby the back rest may be raised, the back rest comprising two side frame pieces, a handle, and slides attached to the handle and working on the said side frame pieces, runners for the sled, the said handle also having extensions adapted to interlock with the runners comprising recesses in the runners and a movable catch carried by the said handle extensions.

7. A sled having a frame with runners and a body portion comprising an aligned seat and back rest adapted to be raised and lowered, a brace for the latter, means to lock the back rest to the runners in its lower position, a handle for the back rest provided with extensions adapted to interlock with the runners comprising recesses in the runners and a movable catch carried by the handle extensions, slides attached to the handle and working on the side frame pieces on the back rest, a hinge whereby the back rest may be raised, and means to lock the latter to the frame in its upper position, the top face of the seat, back rest and brace being adapted to lie in one plane at will.

Signed at New York, in the county of New York and State of New York, this 16th day of June, A. D. 1923.

AUGUST V. SKUR.
CARL J. ENGLUND.